US012754667B2

(12) United States Patent
Zheng

(10) Patent No.: US 12,754,667 B2
(45) Date of Patent: Oct. 6, 2026

(54) METHOD AND APPARATUS FOR RECORDING COLD/HOT STATE OF MEMORY

(71) Applicant: CLOUD INTELLIGENCE ASSETS HOLDING (SINGAPORE) PRIVATE LIMITED, Singapore (SG)

(72) Inventor: Hao Zheng, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 43 days.

(21) Appl. No.: 18/852,360

(22) PCT Filed: Mar. 31, 2023

(86) PCT No.: PCT/CN2023/085534
§ 371 (c)(1),
(2) Date: Sep. 27, 2024

(87) PCT Pub. No.: WO2023/186108
PCT Pub. Date: Oct. 5, 2023

(65) Prior Publication Data

US 2025/0217032 A1 Jul. 3, 2025

(30) Foreign Application Priority Data

Apr. 2, 2022 (CN) ......................... 202210351941.4

(51) Int. Cl.
*G06F 3/06* (2006.01)

(52) U.S. Cl.
CPC .......... *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS 9,063,866 B1 6/2015 Tati et al.
10,552,058 B1 * 2/2020 Jadon .................... G06F 3/0656
(Continued)

FOREIGN PATENT DOCUMENTS

CN 110888821 A 3/2020
CN 113434371 A 9/2021
(Continued)

OTHER PUBLICATIONS

Notification of Grant of Invention Patent Rights dated May 31, 2024 for Application No. 202210351941.4.
(Continued)

*Primary Examiner* — Jared I Rutz
*Assistant Examiner* — Alexander J Yoon

(57) ABSTRACT

A method and an apparatus for recording a cold/hot state of a memory, the method includes: determining a first cold/hot state set, wherein the first cold/hot state set is configured for recording a first cold/hot state type of a reserved memory of a host machine, where a plurality of cold/hot state sets are maintained in the host machine, and each cold/hot state set corresponds to one cold/hot state type; scanning sequentially an item in the first cold/hot state set, wherein the first cold/hot state set includes at least one item, and the at least one item forms an out-of-order array, and each item includes a memory slice serial number, memory size information, a next field and a process field.

20 Claims, 11 Drawing Sheets

(56) References Cited

U.S. PATENT DOCUMENTS

| | | | | |
|---|---|---|---|---|
| 12,130,798 | B1 * | 10/2024 | Brahmadesam | G06F 3/065 |
| 2013/0073886 | A1 * | 3/2013 | Zaarur | G06F 12/0223 713/320 |
| 2014/0115239 | A1 * | 4/2014 | Kong | G06F 12/0246 711/103 |
| 2016/0055097 | A1 * | 2/2016 | Ki | G06F 12/0871 711/160 |
| 2016/0253105 | A1 | 9/2016 | Chang et al. | |
| 2017/0277476 | A1 * | 9/2017 | Shin | G06F 3/0679 |
| 2019/0087229 | A1 * | 3/2019 | Iuliano | G06F 9/544 |
| 2020/0012454 | A1 * | 1/2020 | Jung | G06F 3/0604 |
| 2020/0371700 | A1 * | 11/2020 | Stabrawa | G06F 3/0631 |
| 2022/0035735 | A1 * | 2/2022 | Bhardwaj | G06F 12/0246 |

FOREIGN PATENT DOCUMENTS

| | | | |
|---|---|---|---|
| CN | 114661557 | A | 6/2022 |
| WO | WO2021115021 | A1 | 6/2021 |

OTHER PUBLICATIONS

International Search Report and Written Opinion dated Jun. 11, 2023 for International Application No. PCT/CN2023/085534.

* cited by examiner

METHOD AND APPARATUS FOR RECORDING COLD/HOT STATE OF MEMORY

CROSS-REFERENCE TO RELATED APPLICATIONS

The present disclosure is a National Stage of International Application No. PCT/CN2023/085534, filed on Mar. 31, 2023, which claims the priority of Chinese Patent Application No. 202210351941.4, filed to China National Intellectual Property Administration on Apr. 2, 2022, and titled "Method and apparatus for recording cold/hot state of memory", the entire contents of these applications are incorporated into the present disclosure by reference.

TECHNICAL FIELD

The present disclosure relates to computer technology, in particular to a method and an apparatus for recording a cold/hot state of a memory.

BACKGROUND

With the development of computer technology, virtual machine technology is widely used in data sharing, data storage and other fields. The virtual machine technology refers to a software simulation implementation of hardware equipment. Specifically, a virtual machine can simulate a complete computer hardware system in the form of software, which has the function of an actual computer. A physical computer configured to install virtual machine software is called a host machine. A host machine can support one or more virtual machine systems.

In a host machine memory allocation architecture in virtualization scenario, a small part of host machine memory is used by the host machine itself, while most of the memory is reserved for allocation to a virtual machine. The memory used by the host machine itself can be configured to store management information such as metadata. In a host machine design, it is expected that more reserved memory can be provided for a virtual machine as much as possible. Because the kernel of the host machine can't use the reserved memory, the original memory management system in the kernel can't monitor a cold/hot condition of the reserved memory, which affects the effective use of the reserved memory.

Therefore, it is necessary to design a management scheme of a cold/hot state of a memory in the host machine to implement a function of scanning a cold/hot state of a reserved memory and collecting information, and improve utilization rate of a host machine memory.

SUMMARY

The present disclosure provides a method and an apparatus for recording a cold/hot state of a memory, which can save the memory space occupied by metadata in a host machine and improve memory utilization efficiency of the host machine.

In a first aspect, a method for recording a cold/hot state of a memory is provided, which includes: determining a first cold/hot state set, where the first cold/hot state set is configured for recording a first cold/hot state type of a reserved memory of a host machine, where a plurality of cold/hot state sets are maintained in the host machine, and each cold/hot state set corresponds to one cold/hot state type; scanning sequentially an item in the first cold/hot state set, where the first cold/hot state set includes at least one item, and the at least one item forms an out-of-order array, and each item includes a memory slice serial number, memory size information, a next field and a process field; the scanning sequentially an item in the first cold/hot state set includes: scanning a first memory area in a first item, and judging whether a state transition occurs in the first memory area, where the first item is any one item in the first cold/hot state set, and the first memory area includes one or more continuous memory slices; in the case that a state transition occurs in the first memory area, deleting data recording the first memory area from the first item, and creating a second item in a second cold/hot state set, where the second item is configured for recording a cold/hot state of the first memory area, and the second cold/hot state set corresponds to a second cold/hot state type of the first memory area after the state transition occurs.

In a second aspect, an apparatus for recording a cold/hot state of a memory is provided, which includes a processor and a memorizer in communication with the processor; the memorizer stores a computer-executed instruction; the processor executes the computer-executed instruction stored in the memorizer to implement the following steps: determining a first cold/hot state set, where the first cold/hot state set is configured for recording a first cold/hot state type of a reserved memory of a host machine, where a plurality of cold/hot state sets are maintained in the host machine, and each cold/hot state set corresponds to one cold/hot state type; scanning sequentially an item in the first cold/hot state set, where the first cold/hot state set includes at least one item, and the at least one item forms an out-of-order array, and each item includes a memory slice serial number, memory size information, a next field and a process field; regard to the aspect that the scanning sequentially an item in the first cold/hot state set, the processor is specifically configured to: scan a first memory area in a first item, and judge whether a state transition occurs in the first memory area, where the first item is any one item in the first cold/hot state set, and the first memory area includes one or more continuous memory slices; in the case that a state transition occurs in the first memory area, delete data recording the first memory area from the first item, and create a second item in a second cold/hot state set, where the second item is configured for recording a cold/hot state of the first memory area, and the second cold/hot state set corresponds to a second cold/hot state type of the first memory area after the state transition occurs.

In a third aspect, a computer device is provided, which includes a processor configured to call a computer program from a memorizer, and when the computer program is executed, the processor is configured to perform the method of the first aspect described above.

In a fourth aspect, a computer-readable storage medium is provided, which is configured to store a computer program, which includes codes for performing the method of the first aspect described above.

In a fifth aspect, a computer program product is provided, which includes a computer program including codes for performing the method of the first aspect described above.

In an embodiment of the present disclosure, a memory cold/hot management architecture is proposed to manage a cold/hot state of a reserved memory of a host machine, and an out-of-order array is designed to record a cold/hot change of a reserved memory. Because out-of-order arrangement of the out-of-order array can save memory space, and each item only occupies a few bytes, it saves the memory space occupied by metadata in a host machine while the function of recording a cold/hot state of a memory is completed, and more reserved memory for a virtual machine is reserved, which can improve memory utilization efficiency of the host machine.

BRIEF DESCRIPTION OF DRAWINGS

The accompanying drawings, which are incorporated in and constitute a part of the present specification, illustrate embodiments consistent with the present disclosure and together with the description, serve to explain the principle of the present disclosure.

DESCRIPTION OF EMBODIMENTS

Figure 1:
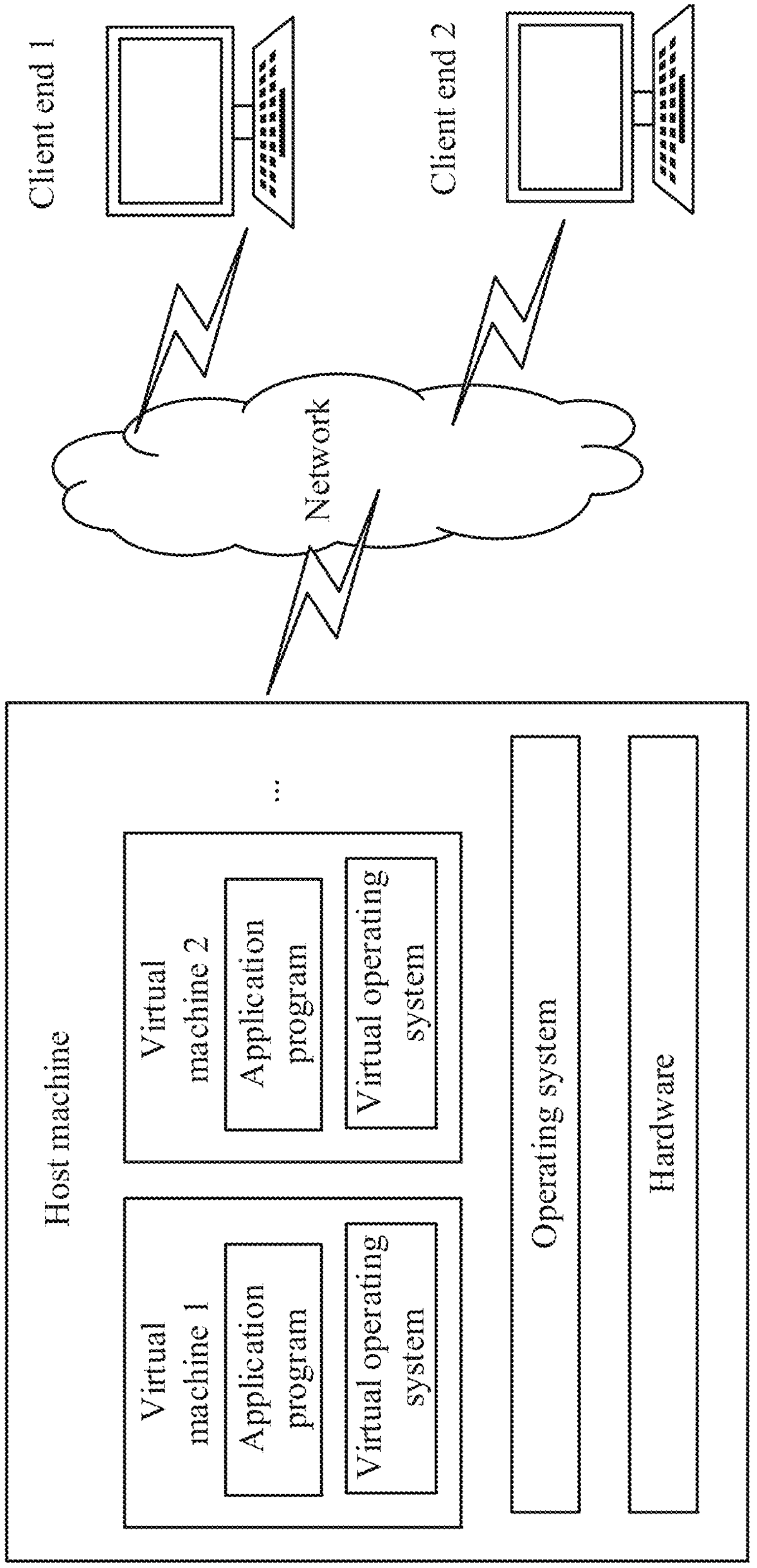
FIG. 1 is a schematic block diagram of an application scenario of an embodiment of the present disclosure.

Reference will now be made in detail to exemplary embodiments, examples of which are illustrated in the accompanying drawings. When the following description refers to the drawings, unless otherwise indicated, the same numbers in different drawings indicate the same or similar elements. The implementations described in the following exemplary embodiments do not indicate all embodiments consistent with the present disclosure. Rather, they are merely examples of an apparatus and a method consistent with some aspects of the present disclosure as detailed in the appended claims.

First, the terms involved in the present disclosure are explained.

Host computer: refers to the main body part of a computer except input and output device; it is also a control box for placing a mainboard and other main components. It usually includes a central processing unit (CPU), a memory, a mainboard, an optical drive, a power supply, and other input/output controller and an interface.

Host machine: refers to a physical computer configured to install virtual machine software. A host machine is a concept relative to a virtual machine, and can refer to a passive node, a physical machine or a host computer.

Virtual machine: refers to a complete computer system which is simulated by software, has functions of a complete hardware system and runs in a completely isolated environment. The virtual machine can implement the work done by a physical computer. When creating a virtual machine in a computer, it is necessary to take part of a hard disk and memory capacity of a physical machine as the hard disk and memory capacity of the virtual machine. Each virtual machine has an independent operating system, which can enable the virtual machine to be operate like a physical machine.

Common virtual machine software includes, but is not limited to, VMware (ACE), Virtual Box and Virtual PC, which can virtualize multiple computers in a physical machine system.

Metadata: refers to data configured for describing data, also known as intermediate data and relay data. The metadata mainly includes information describing a data attribute to support a function such as indicating storage location, historical data, resource search, and file recording. The metadata can also be understood as an electronic catalogue, which describes a content or characteristic of data, thus achieving the purpose of assisting data retrieval.

Struct page: a struct page is a data structure or structure in memory management, which indicates the smallest unit of system memory. A kernel can create a struct page for each physical page frame, so it is expected that the struct page is small enough, otherwise only the struct page needs to occupy a lot of memory resources.

Memory slice: refers to a unit that is configured for dividing a memory in a computer. A size of a memory slice can be determined by preset. For example, a size of a memory slice can be 2 megabytes (MB).

Memory slice serial number (idx): refers to an identification serial number allocated to a memory slice.

Cold/hot memory page: refers to a concept of cold/hot page introduced in a memory management system. A cold page refers that an access bit of a page table entry of a memory slice in a corresponding page table corresponding to a using process is not set, that is, the memory slice is not accessed. The above page table may refer to a virtualization page table or a kernel page table. A hot page refers that an access bit of a page table entry of a memory slice in a corresponding page table corresponding to a using process is set, that is, the memory slice is accessed.

Bidirectional linked list: also known as double linked list, it is a kind of linked list, and each data node thereof has two pointers, which point to a direct successor and a direct predecessor respectively. Therefore, starting from any node in the bidirectional linked list, it is convenient to access its predecessor node and successor node.

Out-of-order array: refers to an array that scrambles the order of stored values. The next field of each item in the out-of-order array will record a serial number of a next item in the array, so it occupies less overhead than the bidirectional linked list.

Least recently used (LRU): refers to a commonly used page replacement algorithm, and its principle is to select a page that has not been used for the longest time recently to be eliminated. This algorithm gives each page an access field, which is configured for recording time t that it has been passed since a page was last visited. When a page needs to be eliminated, the page with a largest t value in the existing pages, that is, the one that has been used least recently, is selected to be eliminated.

Non uniform memory access (NUMA) technology: refers to a kind of computer memory bank design for multi-processors. Under a NUMA structure, a CPU usually has an independent memory controller, and each CPU is independently connected to a part of a memory. A memory directly connected to a CPU is called a local memory. In addition, each CPU can also access a remote memory in a non-direct way. Multiple nodes can be included in a NUMA structure, and each node includes a CPU and a set of memories. Each CPU can access the memories in its own node or other nodes.

Aging: in an embodiment of the present disclosure, aging is configured for indicating a process of recording a cold/hot state of a memory. For example, aging data, or aging accumulated data, refers to data generated by recording a cold/hot state of a memory.

FIG. 1 is a schematic block diagram of an application scenario of an embodiment of the present disclosure. As shown in FIG. 1, through virtual machine software, one or more virtual machine systems can be simulated based on an operating system in a host machine. Each virtual machine can run as an independent computer system, and virtual operating systems in respective virtual machines can be the same or different. As an example, a client end can log in to a virtual machine through a network. The network can be a wide area network or a local area network.

It should be understood that the application scenario in FIG. 1 is only an example, not a limitation, and the scheme of the embodiment of the present disclosure is also applicable to other scenarios where there is a host machine.

Figure 2:
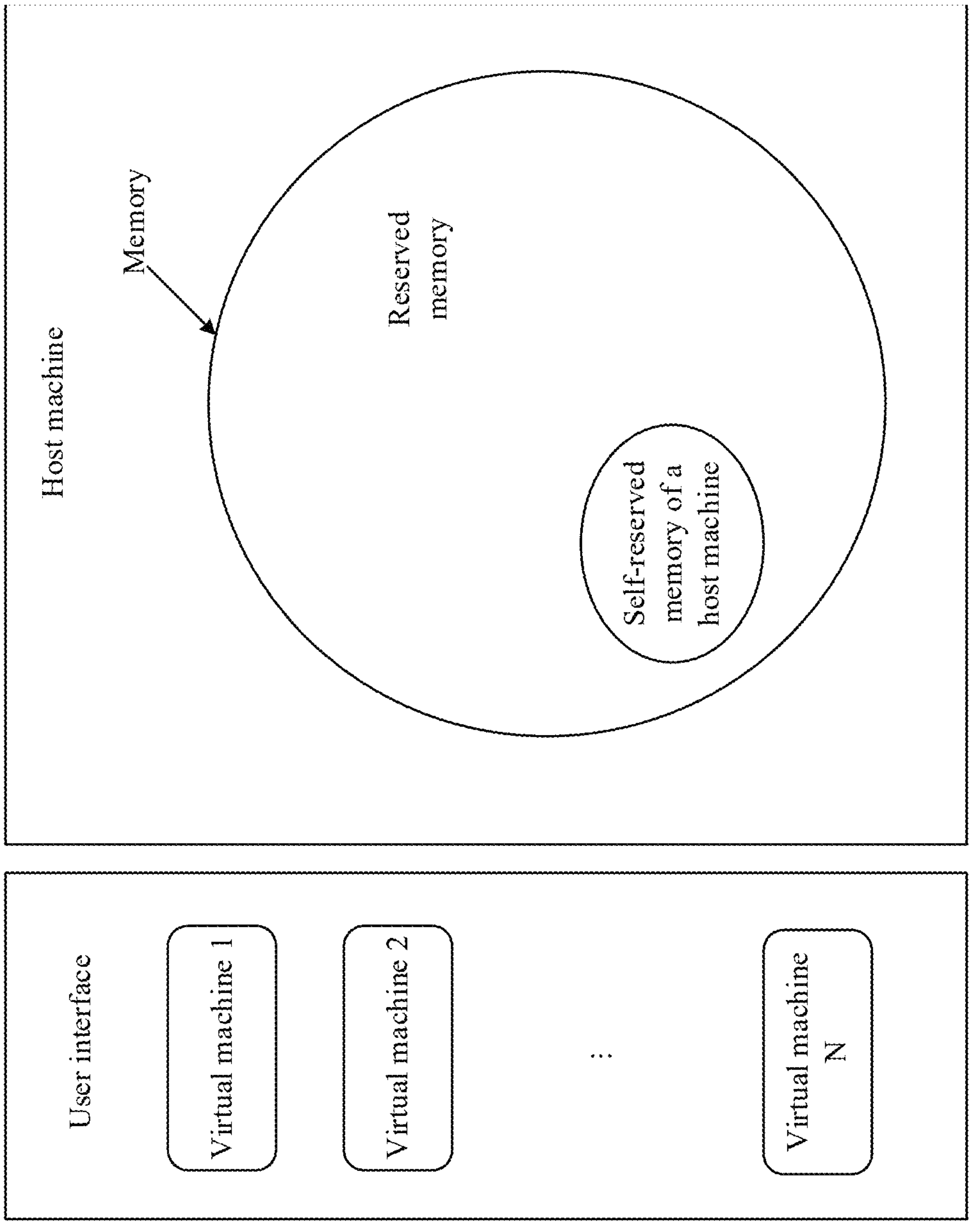
FIG. 2 is a schematic structural diagram of a host machine according to an embodiment of the present disclosure.

FIG. 2 is a schematic structural diagram of a host machine according to an embodiment of the present disclosure. As shown in FIG. 2, the host machine's memory includes a self-reserved memory of the host machine and a reserved memory provided for a virtual machine. The self-reserved memory of the host machine is mainly configured for storing metadata, occupying a small proportion of memory. For example, if a memory size of the host machine is 500 gigabyte (GB), the self-reserved memory of the host machine can occupy 5G space, and 495 GB space is reserved for a virtual machine. Data configured for recording a cold/hot state of a memory belongs to metadata in an embodiment of the present disclosure, and the memory occupied by it belongs to the self-reserved memory of the host machine.

As mentioned above, an embodiment of the present disclosure aims to solve a problem that the existing memory management system cannot monitor a cold/hot condition of a reserved memory in a host machine. In view of the above problem, embodiments of the present disclosure provide a method and an apparatus for managing a cold/hot state of a reserved memory of a host machine, and its main idea is to design an out-of-order array to record a cold/hot change of a reserved memory; also provide a scheme of how to perform capacity-expanding to, sort and perform capacity-shrinking to the array when the host machine records an aging process of cold/hot data of a reserved memory, and how to reset it when an error occurs during scanning. The above scheme can improve the efficiency of memory management, save the memory space occupied by metadata in the host machine, reserve more reserved memory for a virtual machine, and improve memory utilization efficiency of the host machine.

The method of the embodiment of the present disclosure can be executed by any computer including a host machine.

The technical scheme of the present disclosure and how the technical scheme of the present disclosure can solve the above technical problem will be described in detail with specific embodiments. The following specific embodiments can be combined with each other, and the same or similar concepts or processes may not be repeated in some embodiments. Embodiments of the present disclosure will be described below with reference to the accompanying drawings.

Figure 3:
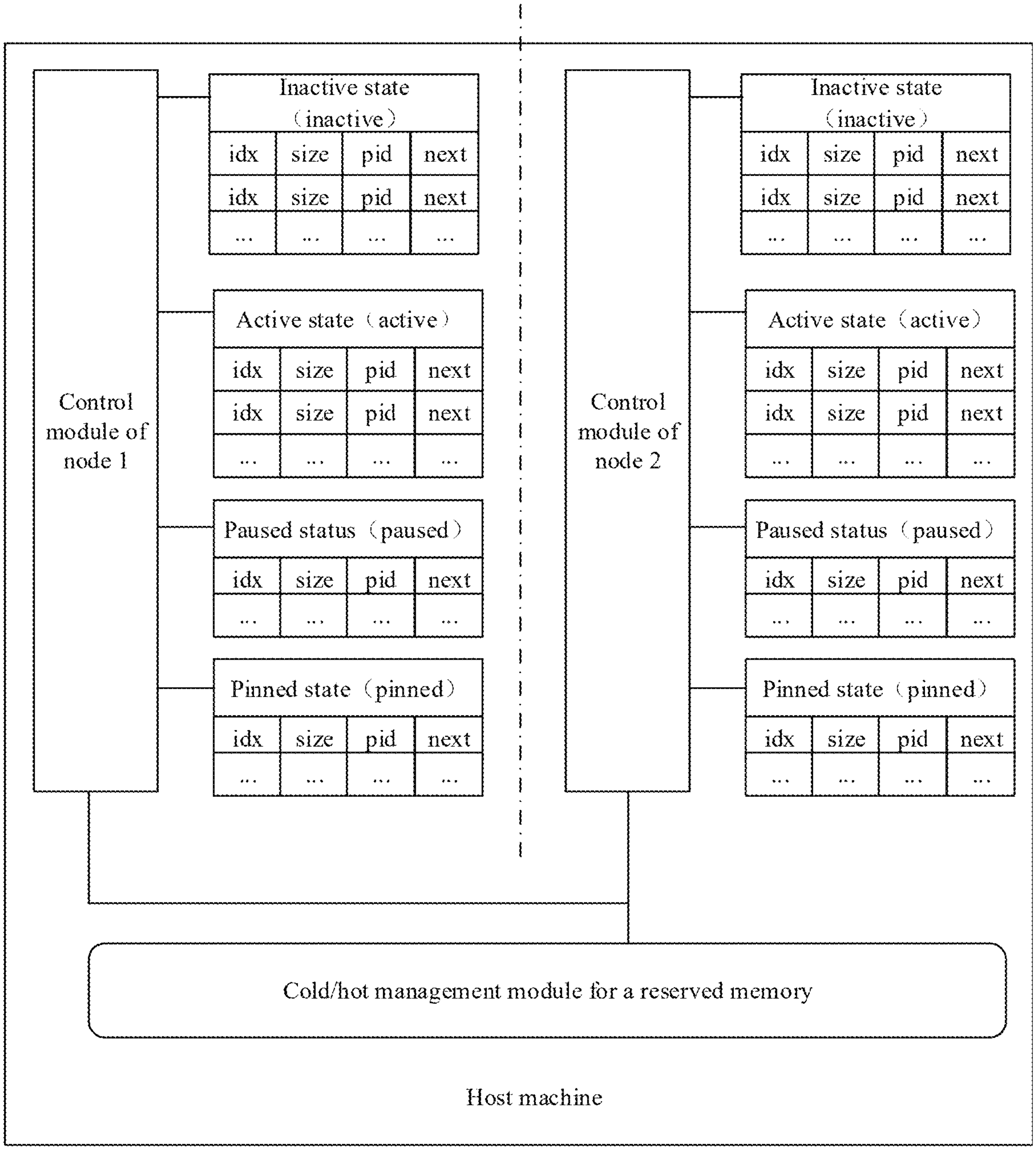
FIG. 3 is a schematic diagram of a memory cold/hot management architecture of a host machine according to an embodiment of the present disclosure.

FIG. 3 is a schematic diagram of a memory cold/hot management architecture of a host machine according to an embodiment of the present disclosure. In some examples, the host machine can support NMMA structure, which refers that in the case of multiple CPUs, the memory of the host machine is divided according to multiple nodes, and each node includes one CPU and one memory set. In this case, the memory cold/hot management architecture can record a structure of each node through a total structure. The above total structure may include substructure of each node. The substructure of the node includes a cold/hot state set corresponding to each of cold/hot state types of the memory.

In an implementation, the total structure can also include a control field of a total cold/hot function of all nodes. As an example, the control field of the above-mentioned total cold/hot function may include: a switch of cold/hot function, a statistics field, a cache pool field, a cache operation queue field, a synchronization lock field, etc. The substructure of the node can also include a protection field and a control field.

In FIG. 3, the host machine supports two nodes as an example. The total structure includes a cold/hot management module for a reserved memory in FIG. 3, and the substructure of the node includes a control module of node 1 and a control module of node 2 in FIG. 3. A plurality of cold/hot state sets are maintained under a control module of each node, and each cold/hot state set corresponds to a cold/hot state type.

As shown in FIG. 3, recording a cold/hot condition of a memory can include various cold/hot state types. In some examples, a cold/hot state type of a memory may include an active state, an inactive state, a paused state, and a pinned state. The definitions of the above states are as follows.

The active state: refers to that a memory slice is in a hot page state.

The inactive state: refers to that a memory slice is in a cold page state.

The paused status: refers to that a memory slice is in temporary suspension of scanning.

The pinned state: refers to that a memory slice is in permanent suspension of scanning.

It should be understood that each of the above-mentioned state types is only an example, and in practice, a cold/hot state type of a memory can include more or less types.

The cold/hot management module can allocate one cold/hot state set for each of the above cold/hot state types of a memory. Each cold/hot state set includes an item array, and the item array includes one or more items, which form an out-of-order array. Each item can be configured to record a serial number, a size, a process of a memory area in the cold/hot state type and an order of each item in the out-of-order array.

As an example, LRU algorithm can be used for organizing the order of the item in the cold/hot state set.

A memory management system in a host machine can pre-allocate a certain amount of items for each cold/hot state set. When an item in a cold/hot state set is used up, capacity-expanding of an array can be performed on the cold/hot state set.

In an implementation, other management information can also be included in a cold/hot state set, for example, information indicating a size of an item array in a cold/hot state set; information for indicating a current use state of an item array; oldest field information for indicating a serial number of the oldest item in an item array, and a memory corresponding to the oldest item refers to a memory area that has entered the item array for the longest time.

Continuing to refer to FIG. 3, a cold/hot state set records a cold/hot condition of a reserved memory in the form of out-of-order array. An array includes multiple items, each of which includes a memory slice serial number (idx), a memory size (size), a next field (next) and a process field (pid).

The idx indicates a serial number of a memory slice, and a size field indicates a size of a memory. As an out-of-order array is adopted in an embodiment of the present disclosure, orders of items are disordered, so the next field is configured to record a next item of a current item. In other words, the next field can be configured to determine an order of respective items in an out-of-order array. The pid field is configured to indicate a process to which a memory belongs. The pid field can be configured for subsequent record of allocated memory information.

In some examples, a memory area corresponding to one item may include one memory slice or a plurality of memory slices that are continuous on physical address. The idx can indicate a serial number of a memory slice at the beginning of the memory area, and the size can indicate the number of memory slices included in the memory area. A size of each memory slice can be predefined, for example, a size of one memory slice can be set to 2 MB. As an example, if the size=10, it indicates that the memory area corresponding to this item includes 10 consecutive memory slices.

Traditional memory management links all related metadata indicating pages in the form of a bidirectional linked list, and the overhead of one bidirectional linked list is 16 bytes. However, in an embodiment of the present disclosure, one field occupies 4 bytes, and the total overhead of one item is 16 bytes, which is less than that of using a linked list structure, thus reducing memory overhead.

In an embodiment of the present disclosure, the main overhead of recording a cold/hot state of a memory is generated by an item array. Because the structure of an out-of-order array is adopted, and the overhead of each item only is 16 bytes, memory occupation can be reduced while the function of recording a cold/hot state of a memory is completed, and the memory space reserved for a virtual machine is increased.

In an example, it is supposed that each item only records a cold/hot condition of a memory slice with a size of 2 MB, and a host machine with 500 G only needs metadata overhead of 3.9 MB. Moreover, considering that there are a large number of local regular cold/hot memory areas in actual operation, the metadata overhead can even be reduced to a scale of more than 100 KB, thus reducing occupation of memory by metadata.

Figure 4:
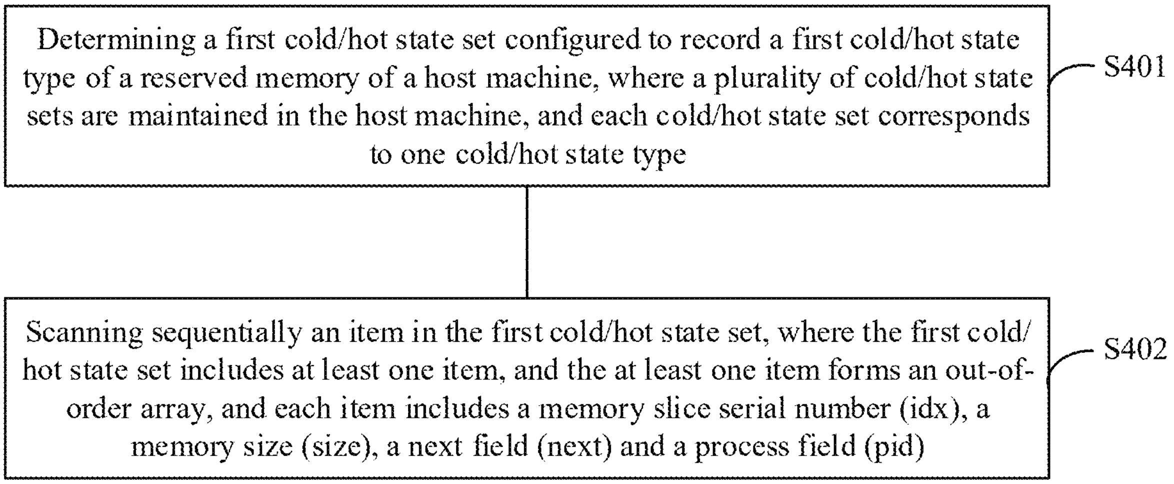
FIG. 4 is a schematic flow diagram of a method for recording a cold/hot state of a memory according to an embodiment of the present disclosure.

FIG. 4 is a schematic flow diagram of a method for recording a cold/hot state of a memory according to an embodiment of the present disclosure. The method of the embodiment of the present disclosure can be executed by a host machine, and a memory of the host machine can support a single-node structure or a multi-node structure. As shown in FIG. 4, the method includes the following contents.

S401, determining a first cold/hot state set configured to record a first cold/hot state type of a reserved memory of a host machine, where a plurality of cold/hot state sets are maintained in the host machine, and each cold/hot state set corresponds to one cold/hot state type.

The above-mentioned cold/hot state type can refer to various types of recording a cold/hot state of a memory in the previous text. The cold/hot state type includes, but is not limited to, an active state, an inactive state, a paused state and a pinned state.

In some examples, the first cold/hot state type may include an active state or an inactive state, or may be other cold/hot state types.

S402, scanning sequentially an item in the first cold/hot state set, where the first cold/hot state set includes at least one item, and the at least one item forms an out-of-order array, and each item includes a memory slice serial number (idx), a memory size (size), a next field (next) and a process field (pid).

In S402, the scanning sequentially an item in the first cold/hot state set includes: scanning a first memory area in a first item to judge whether a state transition occurs in the first memory area, where the first item is any one item in the first cold/hot state set, and the first memory area includes one or more continuous memory slices; when a state transition occurs in the first memory area, deleting data recording the first memory area from the first item, and creating a second item in a second cold/hot state set, where the second item is configured to record a cold/hot state of the first memory area and the second cold/hot state set corresponds to a second cold/hot state type of the first memory area after the state transition occurs.

The state transition can refer to a change of a cold/hot state type of a memory area, for example, from an active state to an inactive state, or from an inactive state to a paused state.

In an embodiment of the present disclosure, a memory cold/hot management architecture is proposed to manage a cold/hot state of a reserved memory of a host machine, and an out-of-order array is designed to record a cold/hot change of a reserved memory. Because out-of-order arrangement of the out-of-order array can save memory space, and each item only occupies a few bytes, it saves the memory space occupied by metadata in the host machine while the function of recording a cold/hot state of a memory is completed, and more reserved memory for a virtual machine is reserved, which can improve memory utilization efficiency of the host machine.

In an implementation, in an embodiment of the present disclosure, before S402, the method of FIG. 4 further includes: acquiring a scanning lock corresponding to the first cold/hot state set, and the scanning lock is configured to prevent other tasks from updating the memory range being scanned during scanning.

In an implementation, a high threshold and a low threshold can be preset for each cold/hot state set, where the low threshold is configured to judge whether capacity-expanding needs to be performed on a cold/hot state set when the cold/hot state set in a non-scanning state; the high threshold is configured to judge whether capacity-expanding needs to be performed on a cold/hot state set when the cold/hot state set is in a scanning state. It should be noted that since the scanning lock is needed in a scanning state, and the overhead of performing capacity-expanding in the case of using the scanning lock is large, the capacity-expanding is performed as least as possible during scanning, and a set value of the high threshold is also higher than the low threshold. The specific value of the high threshold can be determined according to practice, and it is not limited too much in the present disclosure.

In some examples, before S402, the method of FIG. 4 further includes: judging whether a ratio of the number of used item to the total number of item in the first cold/hot state set reaches a low threshold before the scanning sequentially an item in the first cold/hot state set; if it reaches the low threshold, performing capacity-expanding operation on the first cold/hot state set.

In some examples, in S402, the method of FIG. 4 further includes: judging whether the ratio of the number of used item to the total number of item in a second cold/hot state set reaches a high threshold before the creating a second item in a second cold/hot state set, where the low threshold is smaller than the high threshold; if it reaches the high threshold, performing capacity-expanding operation on the second cold/hot state set.

It should be noted that in an embodiment of the present disclosure, reaching a certain threshold can indicate being greater than or equal to a certain threshold. For example, reaching a low threshold can indicate being greater than or equal to a low threshold, and the same applies in the following description.

In some examples, if it is necessary to perform capacity-expanding to a cold/hot state set, the capacity of the cold/hot state set can be doubled. In an implementation, capacity-expanding can be performed on a cold/hot state set according to other standard, for example, according to a specified size or an actual demand, which is not limited in embodiments of the present disclosure.

Figure 5:
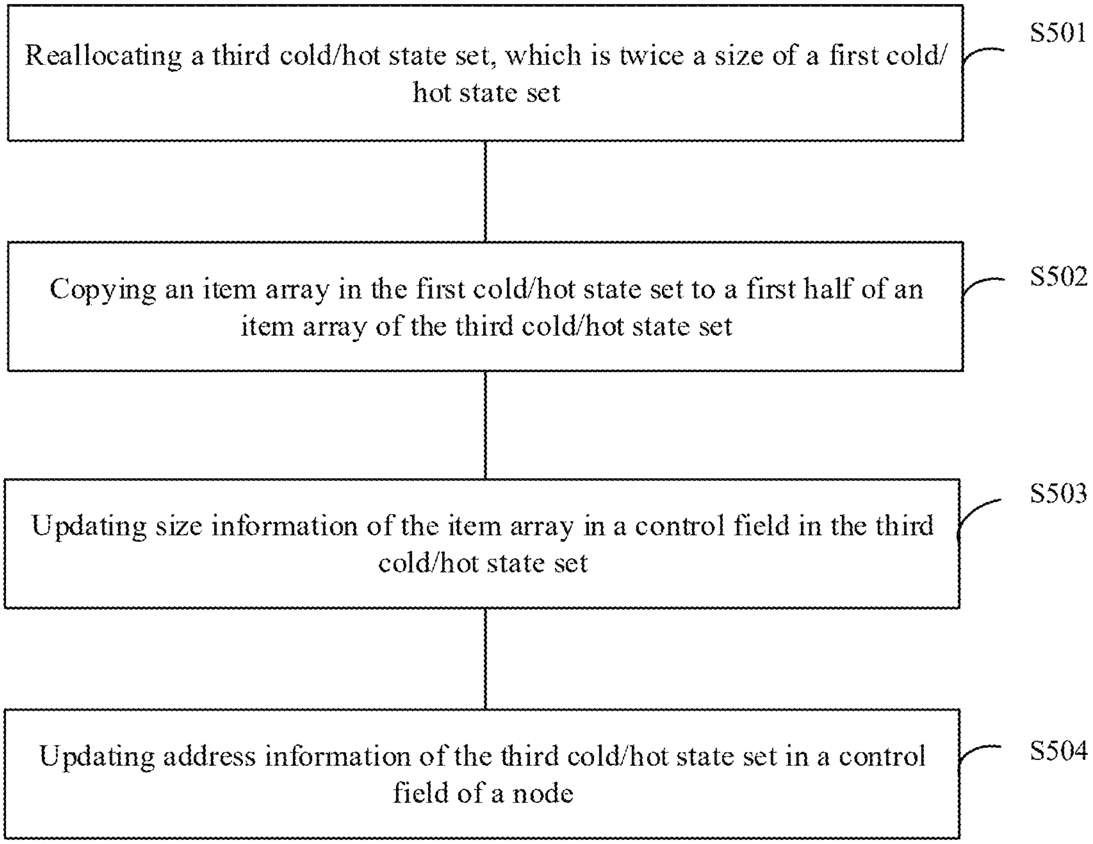
FIG. 5 is a schematic flow diagram of a method for performing capacity-expanding on a cold/hot state set in a non-scanning state according to an embodiment of the present disclosure.

FIG. 5 is a schematic flow diagram of a method for performing capacity-expanding on a cold/hot state set in a non-scanning state according to an embodiment of the present disclosure. As shown in FIG. 5, for example, the standard of capacity-expanding is to double the size, the step of performing capacity-expanding on a cold/hot state set includes the following contents.

S501, reallocating a third cold/hot state set, which is twice a size of a first cold/hot state set.

The first cold/hot state set is an original cold/hot state set, and the third cold/hot state set is a cold/hot state set after capacity-expanding.

S502, copying an item array in the first cold/hot state set to a first half of an item array of the third cold/hot state set.

Alternatively, the order of respective items in the item array is not changed, and only the first half of the item array of the third cold/hot state set is occupied, and the second half of the item array of the third cold/hot state set is an idle item from capacity-expanding.

S503, updating size information of the item array in a control field in the third cold/hot state set.

S504: updating address information of the third cold/hot state set in a control field of a node.

In some examples, before S402, the method of FIG. 4 further includes: judging whether a used item in the first cold/hot state set is empty; if the used item in the first cold/hot state set is empty, judging whether capacity-expanding has been performed on the first cold/hot state set; if the capacity-expanding has been performed on the first cold/hot state set, performing a capacity-shrinking operation on the first cold/hot state set.

Figure 6:
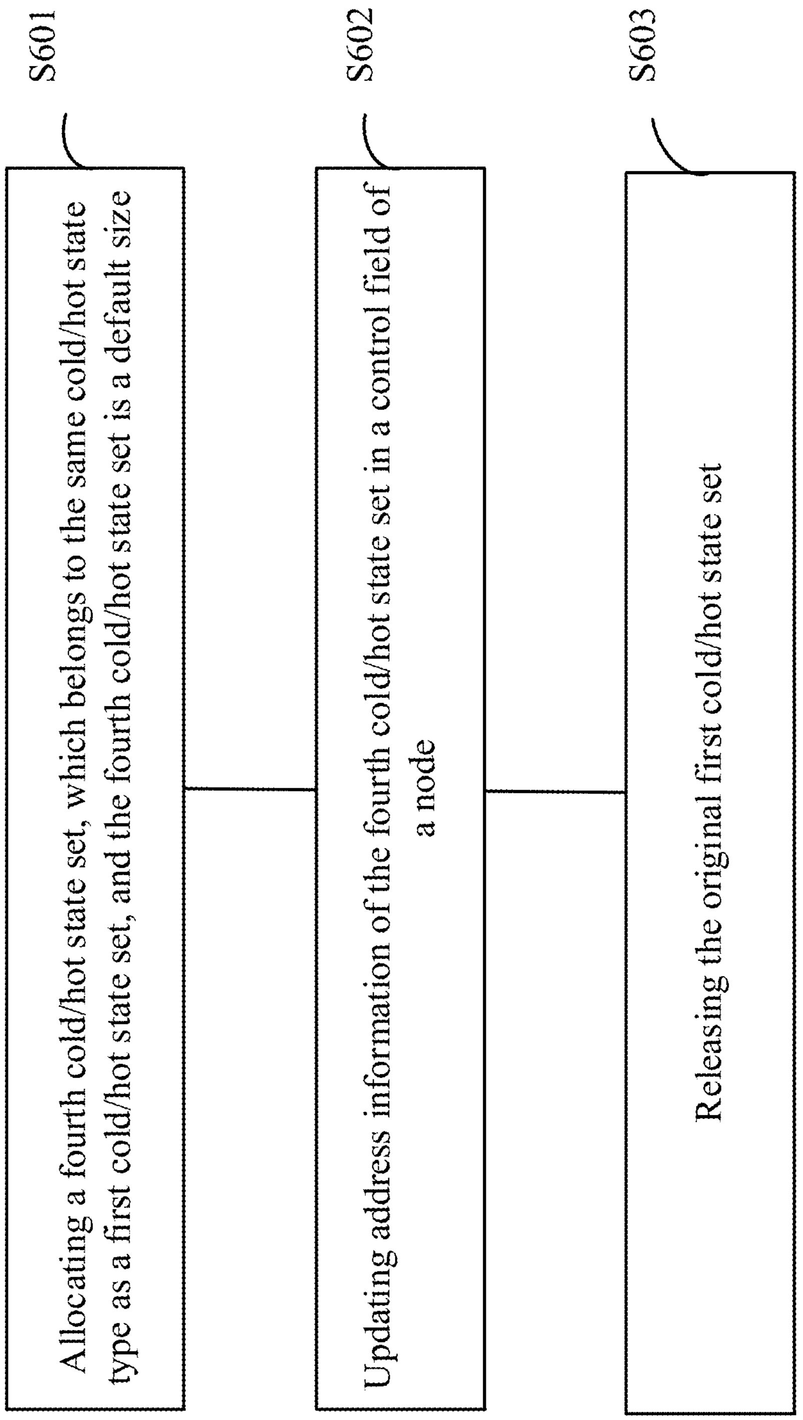
FIG. 6 is a schematic flow diagram of a method for performing capacity-shrinking on a cold/hot state set in a non-scanning state according to an embodiment of the present disclosure.

FIG. 6 is a schematic flow diagram of a method for performing capacity-shrinking on a cold/hot state set in a non-scanning state according to an embodiment of the present disclosure. As shown in FIG. 6, for example, the standard of shrinking is a default size, the step of performing capacity-shrinking on a cold/hot state set includes the following contents.

S601, allocating a fourth cold/hot state set, which belongs to the same cold/hot state type as a first cold/hot state set, and the fourth cold/hot state set is a default size.

S602: updating address information of the fourth cold/hot state set in a control field of a node.

S603: releasing the original first cold/hot state set.

In an implementation, the above specific scheme of scanning an item in the first cold/hot state set can be determined according to practice. As an example, an example of a specific method of scanning a cold/hot state set will be described below with reference to FIG. 7.

Figure 7:
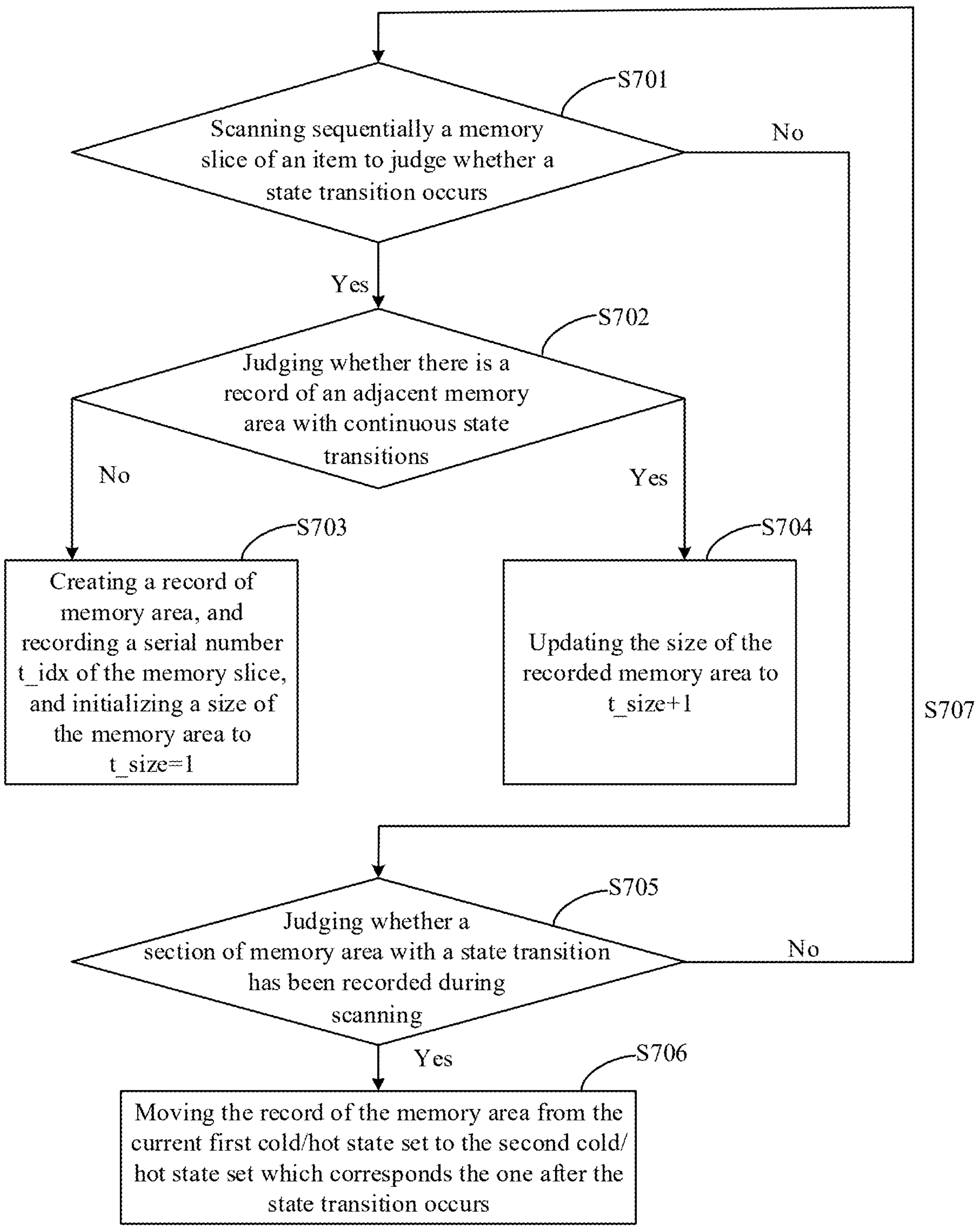
FIG. 7 is a schematic flow diagram of a specific method for scanning an item of a cold/hot state set according to an embodiment of the present disclosure.

FIG. 7 is a schematic flow diagram of a specific method for scanning an item of a cold/hot state set according to an embodiment of the present disclosure. As shown in FIG. 7, taking a currently scanned first cold/hot state set corresponding to an inactive state as an example, the method includes the following contents.

701, scanning sequentially a memory slice in an item of a first cold/hot state set according to an order of physical address to judge whether a state transition occurs.

In an implementation, embodiments of the present disclosure do not limit the way of judging whether a state transition occurs, and as an example but not limitation, whether a state transition occurs in a memory slice can be determined by querying a page table entry.

702, if it is found that a state transition occurs in a memory slice during scanning, for example, from an inactive state to an active state, judging whether there is a record of an adjacent memory area with continuous state transitions during scanning.

Alternatively, it is judged whether there is one or more continuous memory slices with a state transition adjacent to the memory slice. These memory slices can belong to the same process and are continuous areas on physical addresses.

As an example, the memory area is indicated as range [t_idx, t_size, pid], where range indicates a range of a memory, t_idx indicates a serial number of a first memory slice in the memory area, t_size indicates a size of the memory area, and pid indicates a process to which the memory area belongs. During scanning, the above parameters can be recorded as temporary variables.

703, if it is determined that there is no record of a memory area with continuous state transitions, creating a record of memory area, and recording a serial number of the memory slice as a serial number t_idx of a first memory slice in the memory area, and initializing a size of the memory area to t_size=1.

704, if it is determined that there is a record of a memory area with continuous state transitions, updating the size of the recorded memory area to t_size+1.

705, if a cold/hot state type of a current memory slice is not changed, judging whether a section of memory area with a state transition has been recorded during scanning, and the memory area includes one or more continuous memory slices.

706, if it is determined that a section of memory area with a state transition has been recorded in previous, it indicates that a section of continuous memory area with a state transition has been found, and it is necessary to move the record of the memory area from the current first cold/hot state set to the second cold/hot state set which corresponds to the one after the state transition occurs, and clean up a temporary variable such as t_idx and t_size.

Specifically, the data recording the memory area can be deleted from an item in the first cold/hot state set, and a new item can be created in the second cold/hot state set, and the new item is configured to record a cold/hot state of the memory area.

In an implementation, during moving out of the memory area, there may be cases of deleting an item or an inserting item, which will change a position of an original item in a cold/hot state set, so it is necessary to update a value of a scanning parameter during scanning. The scanning parameter includes, but is not limited to, previous position information (prev parameter), current position information (cur parameter) and next position information (nex parameter). The cur parameter indicates the current position information of the item being scanned in the cold/hot state set, the prev parameter indicates the position information of the item previous to the one being scanned, and the nex parameter indicates the position information of the item next to the one being scanned.

For example, after moving the memory area out of the item, if the memory area is in a middle area of the memory corresponding to the item, the remaining memory in the item includes two unconnected memory areas, and a new item needs to be inserted to record a cold/hot state of the extra memory areas.

For another example, when the memory area is moved out to a new cold/hot state set, it is also necessary to create a new item to record the moved-in memory area.

In an implementation, in the case that a new item needs to be inserted during scanning, at first, it can be judged whether it is necessary to perform capacity-expanding on a cold/hot state set. For example, if the number of item in the cold/hot state set reaches a high threshold, it is necessary to enter a capacity-expanding process.

S707, if it is determined that a section of memory area with a state transition has not been recorded in previous, S701 can be continued until the scanning of the item is finished.

Figure 8:
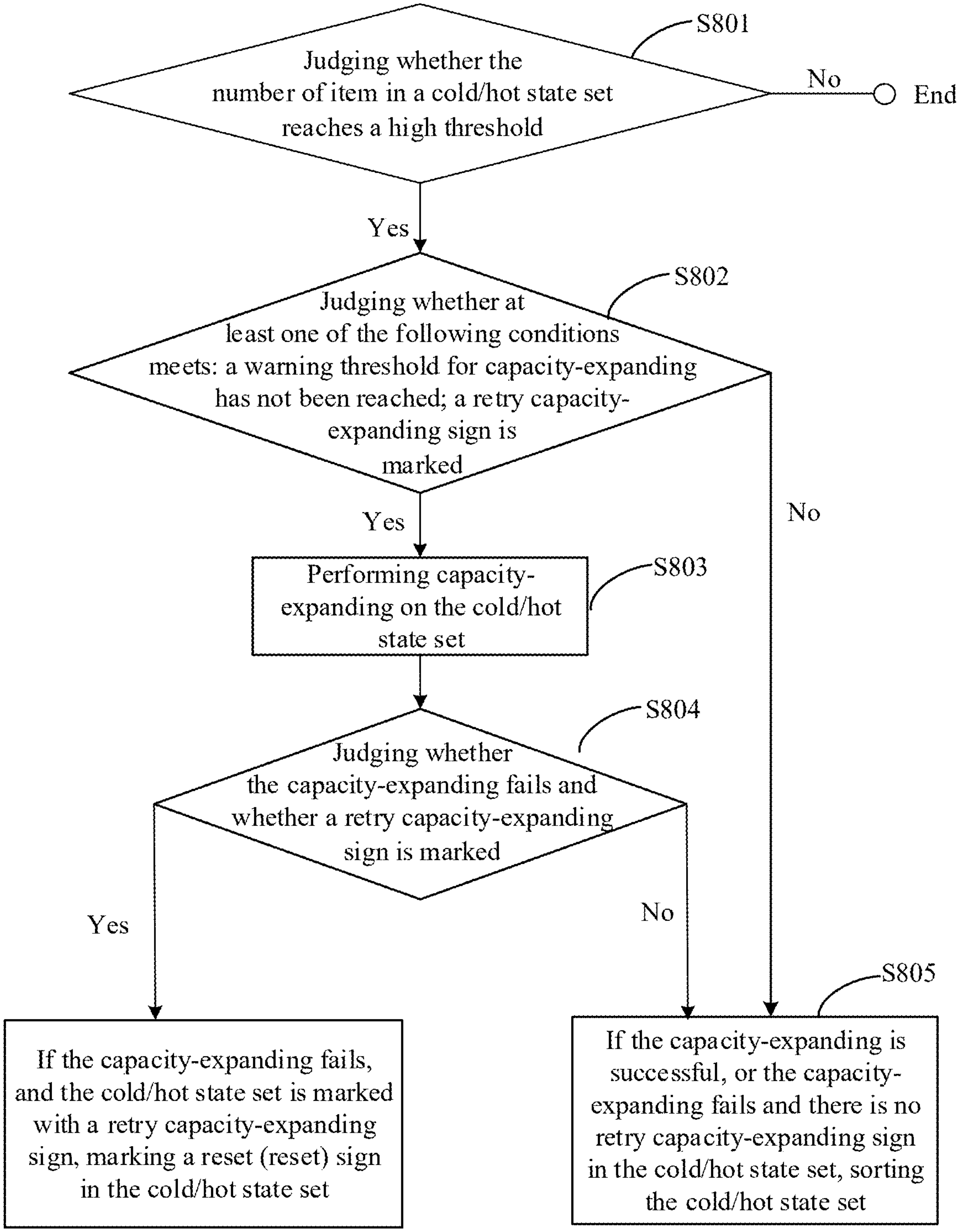
FIG. 8 is a schematic flow diagram of a method for performing capacity-expanding on a cold/hot state set in a scanning state according to an embodiment of the present disclosure.

FIG. 8 is a schematic flow diagram of a method for performing capacity-expanding on a cold/hot state set in a scanning state according to an embodiment of the present disclosure. As shown in FIG. 8, for example, the standard of capacity-expanding is to double the size, the step of performing capacity-expanding on a cold/hot state set includes the following contents.

S801, judging whether the number of item in a cold/hot state set reaches a high threshold, and if it reaches the high threshold, determining to enter a capacity-expanding process.

It should be noted that the overhead of capacity-expanding under in the case of using a scanning lock is large, the capacity-expanding is performed as least as possible during scanning. A set value of the high threshold is also higher than the low threshold, and the specific value of the high threshold can be determined according to practice, so it is not limited too much in the present disclosure.

In an implementation, if the number of item in the cold/hot state set does not reach the high threshold, the capacity-expanding process is not needed.

S802, in an implementation, it can be further judged whether a size of the cold/hot state set meets at least one of the following conditions: a warning threshold for capacity-expanding has not been reached; the cold/hot state set is marked with a retry capacity-expanding sign; if yes, a capacity-expanding process can be continued, and step S803 is executed; if not, capacity-expanding cannot be performed, but step S805 is executed.

S803, performing capacity-expanding on the cold/hot state set.

As an example, a capacity of the cold/hot state set can be doubled.

It should be noted that capacity-expanding mode can be determined according to a type of scanning lock because it is currently in a state of scanning lock. For example, if the scanning lock is a sleepless lock, capacity-expanding needs to be performed by atomic allocation. If the scanning lock is a sleepable lock, capacity-expanding needs to be performed by non-atomic allocation. The success rate of the capacity-expanding through non-atomic allocation is higher, especially suitable for applying for larger memory.

S804, if the capacity-expanding fails, and the cold/hot state set is marked with a retry capacity-expanding sign, a reset (reset) sign can be marked in the cold/hot state set. If the capacity-expanding is successful, or the capacity-expanding fails and there is no retry capacity-expanding sign in the cold/hot state set, step S805 can be executed.

In an implementation, after marking the reset sign, in the subsequent process, it can jump out of a cycle and reset (also called reallocate) and initialize all cold/hot state sets. The method of resetting a cold/hot state set will be introduced with reference to FIG. 10 in the following.

The retry capacity-expanding sign refers that during cold and hot scanning, an irreparable error where data integrity is compromised occurs, such as the capacity-expanding fails or unexpected residual data detected during inspection, so it is necessary to clean up original cold/hot data and start to accumulate cold/hot data again.

S805, in an implementation, after capacity-expanding is performed on the cold/hot state set for many times, the cold/hot state set can be sorted and adjacent items thereof can be merged.

Figure 9:
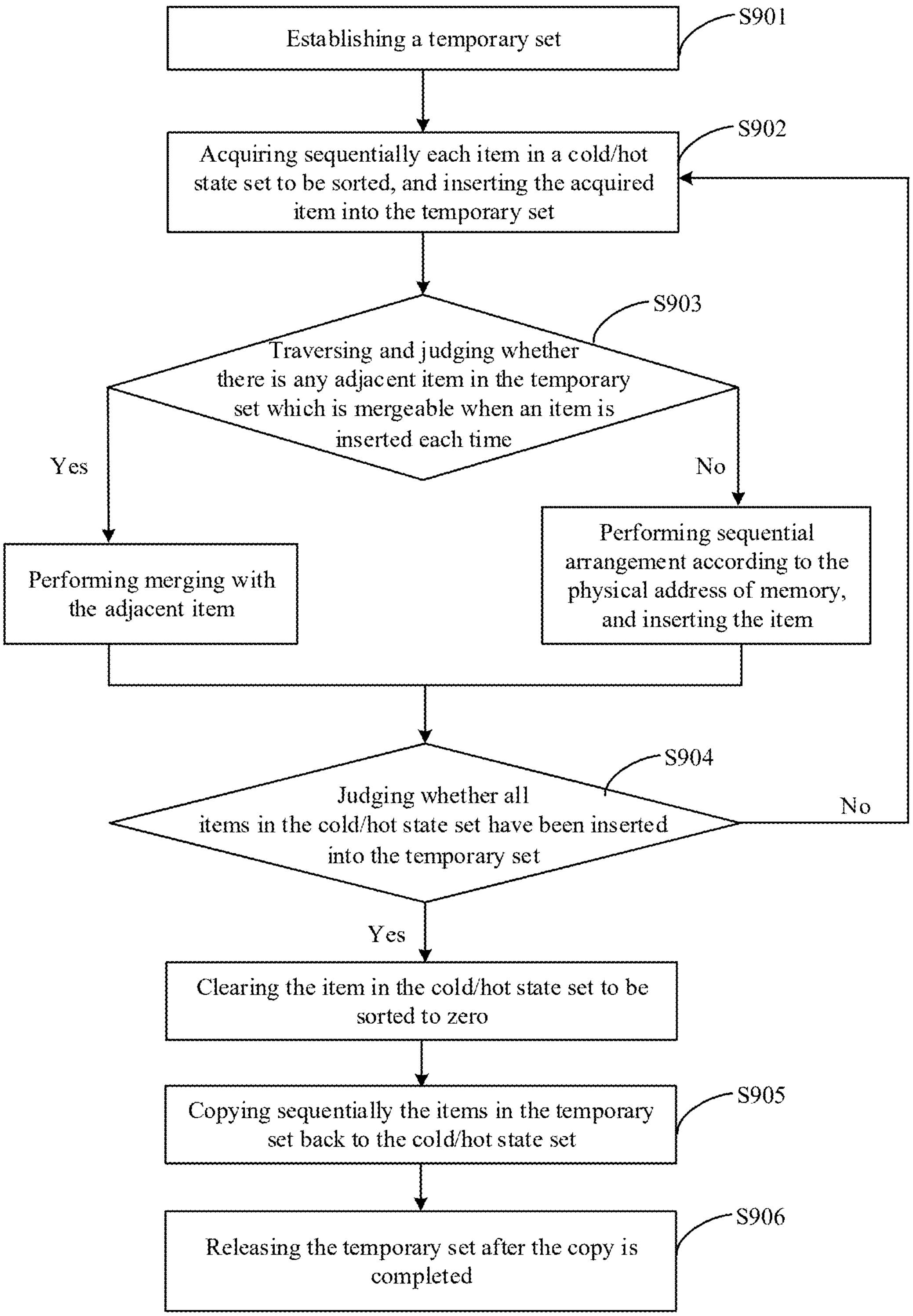
FIG. 9 is a schematic flow diagram of a method for sorting a cold/hot state set according to an embodiment of the present disclosure.

For a specific method of sorting a cold/hot state set, please refer to FIG. 9 and related description.

In some examples, before S402, the method of FIG. 4 further includes: judging whether a size of a second cold/hot state set reaches a warning threshold before the creating a second item in the second cold/hot state set; when the warning threshold is reached, sorting the second cold/hot state set, where the sorting includes: performing merging operation on mergeable items in the second cold/hot state set.

The warning threshold is configured to judge whether a capacity of a cold/hot state set is too large to suitable for performing directly capacity-expanding. For example, if capacity-expanding has been performed on the second cold/hot state set for many times and the capacity has exceeded the warning threshold, it is necessary to sort the second cold/hot state set to increase the available space in the second cold/hot state set.

In some examples, the sorting the second cold/hot state set includes: establishing a temporary set; inserting sequentially the item in the second cold/hot state set into the temporary set, and traversing and judging whether there are mergeable items in the temporary set when inserting the item; if there are mergeable items, performing merging operation on the items; if there are no mergeable items, inserting a item into the temporary set according to an order of physical address; after all items in the second cold/hot state set are inserted into the temporary set, the second cold/hot state set is cleared to zero; copying the items in the temporary set to the second cold/hot state set being cleared to zero, and releasing the temporary set.

The above-mentioned mergeable items can refer that the memory areas indicated by two or more items in the cold/hot state set are continuous areas and belong to the same process, so they can be merged into one item to save overhead.

FIG. 9 is a schematic flow diagram of a method for sorting a cold/hot state set according to an embodiment of the present disclosure. As shown in FIG. 9, the method includes the following contents.

S901, establishing a temporary set.

In an implementation, a size of the temporary set can be a default size or can be determined according to practice.

S902, acquiring sequentially each item in a cold/hot state set to be sorted, and inserting the acquired item into the temporary set.

Alternatively, the items in the cold/hot state set to be sorted are moved or copied to the temporary set cyclically.

In an implementation, if a capacity of the temporary set is insufficient during inserting, capacity-expanding can be performed on the temporary set. In an implementation, only the capacity-expanding can be performed on the temporary set without sorting, otherwise it may enter a state of infinite nested recursion. In some examples, if the capacity-expanding process of the temporary set fails, the cold/hot state set can be marked with a reset (reset) sign, so as to jump out of a cycle process according to the reset sign and reset and initialize all cold/hot state sets.

S903: traversing and judging whether there is any adjacent item in the temporary set which is mergeable according to a physical address of a corresponding memory of an item when an item is inserted each time, and if mergeable, performing merging with the adjacent item; if not mergeable, performing sequential arrangement according to the physical address of memory, and inserting the item into an appropriate position in the temporary set. As an example, the above sequential arrangement may be an ascending arrangement.

The memory area corresponding to the adjacent item and the memory area corresponding to the current item are adjacent on physical address.

S904, judging whether all items in the cold/hot state set to be sorted have been inserted into the temporary set; if yes, clearing the item in the cold/hot state set to be sorted to zero, and executing S905; if not, executing in continue a cycle process from S902.

S905: copying sequentially the items in the temporary set back to the cold/hot state set.

In an implementation, every time an item is copied, it can be judged again whether an item can be merged with an item stored in the cold/hot state set.

S906, releasing the temporary set after copy of the items in the temporary set is completed.

In an implementation, if the sorting fails during sorting, the cold/hot state set can be marked with a reset (reset) sign, so as to jump out of the cycle process according to the reset sign subsequently, and reset and initialize all cold/hot state sets.

In an implementation, if the number of used items in the sorted cold/hot state set is still greater than the high threshold, it can retry to perform capacity-expanding on the cold/hot state set.

In an implementation, if an error occurs during scanning the cold/hot state set, the cold/hot state set can be marked with a reset (reset) sign. If one or more cold/hot state sets are marked with the reset sign, it indicates that aging data has accumulated seriously, and all cold/hot state sets maintained by a node in the host machine can be released to facilitate reallocating.

Figure 10:
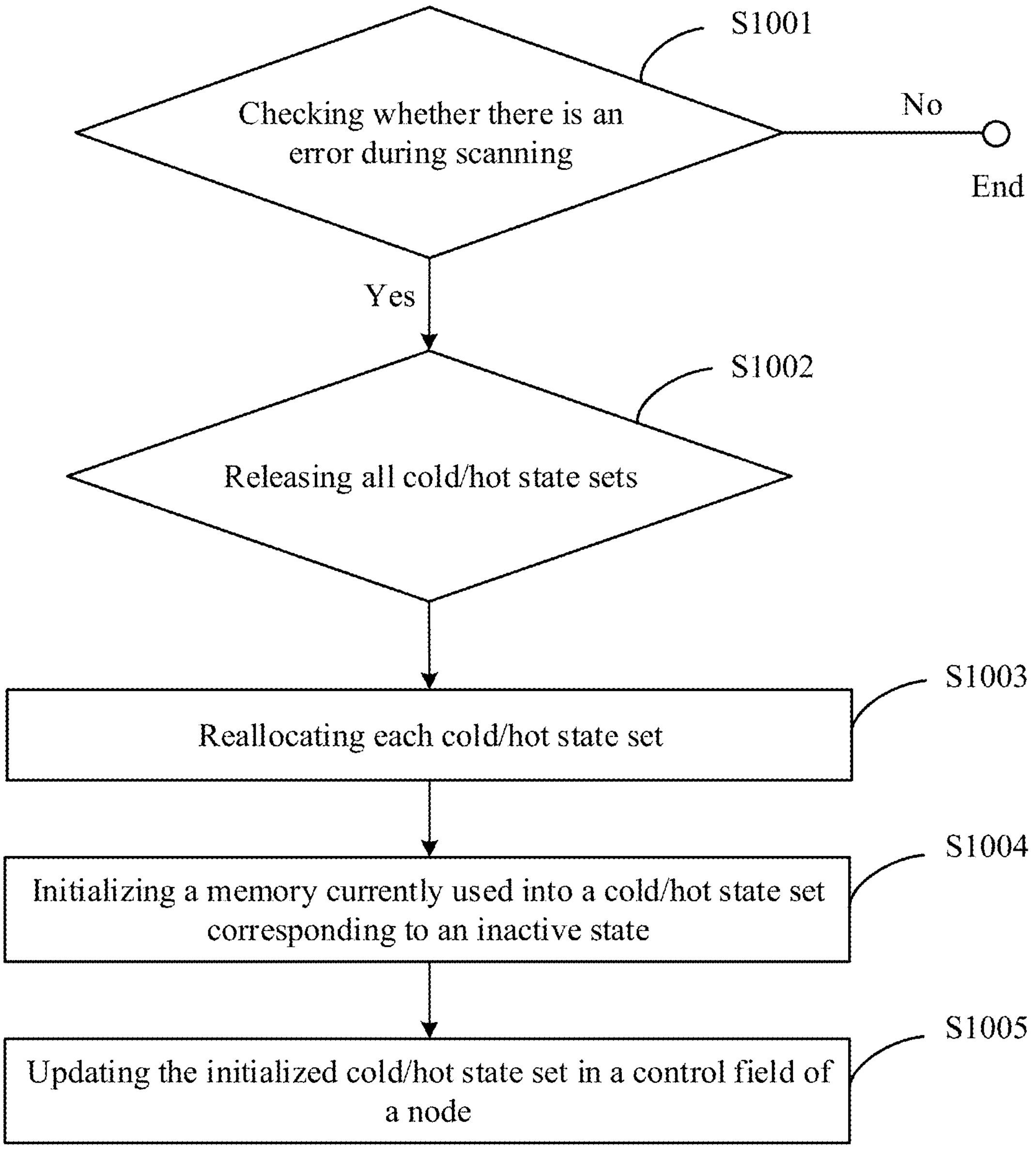
FIG. 10 is a schematic flow diagram of a method for resetting a cold/hot state set according to an embodiment of the present disclosure.

FIG. 10 is a schematic flow diagram of a method for resetting a cold/hot state set according to an embodiment of the present disclosure. As shown in FIG. 10, the method includes the following contents.

S1001, checking whether there is an error during scanning.

For example, checking whether there is a reset (reset) sign in each cold/hot state set, and if there is a reset (reset) sign, it indicates that there is an error during scanning.

S1002, if there is an error, releasing all cold/hot state sets to prepare for reallocating.

If there is no error, there is no need to enter a reset process.

S1003, reallocating each cold/hot state set.

In some examples, in a process of reallocating, it can be set that a newly allocated cold/hot state set inherits a size of a previous cold/hot state set corresponding to the same cold/hot state type.

In an implementation, in a process of reallocating, if a cold/hot state set has a reset sign before it is released, the size of the reallocated cold/hot state set can be expanded to twice that of the original cold/hot state set.

S1004, initializing a memory currently used into a cold/hot state set corresponding to an inactive state.

S1005, updating the initialized cold/hot state set in a control field of a node to wait for a next cycle to carry out aging accumulation again.

It should be understood that aging accumulated data can be accumulated at any time. If there is an error in an intermediate process, it indicates that previous accumulated data has been lost, which will not affect the subsequent data accumulation and will eventually return to a stable state.

Figure 11:
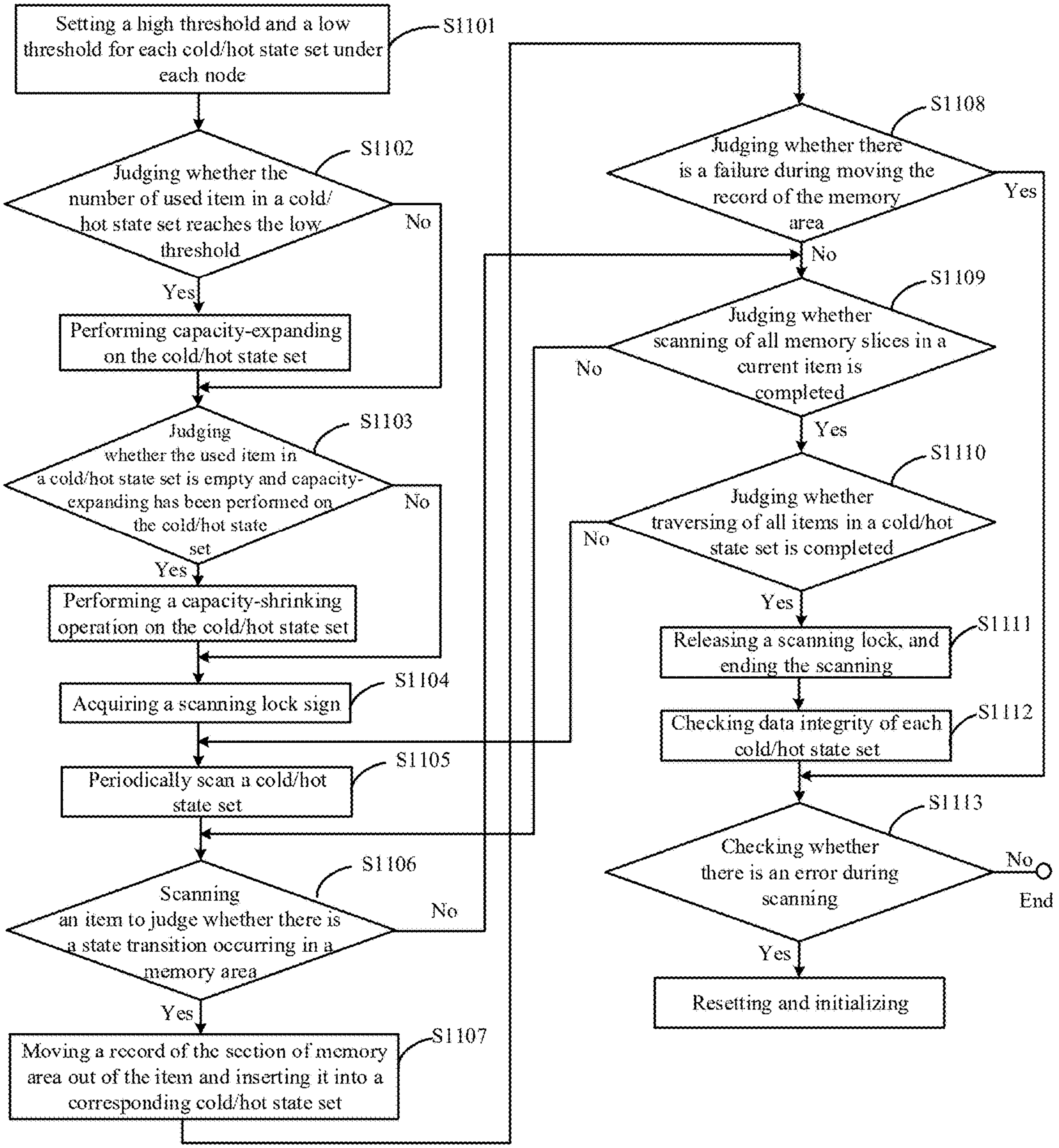
FIG. 11 is a concrete schematic flow diagram of a method for recording a cold/hot state of a memory according to an embodiment of the present disclosure.

FIG. 11 is a concrete schematic flow diagram of a method for recording a cold/hot state of a memory according to an embodiment of the present disclosure. As shown in FIG. 11, the method includes the following contents.

S1101, setting a high threshold and a low threshold for each cold/hot state set under each node.

S1102, judging respectively whether the number of used item in each cold/hot state set reaches the low threshold before periodic scanning, and if any cold/hot state set reaches the low threshold, performing capacity-expanding on the cold/hot state set; if not, no need to perform capacity-expanding on a cold/hot state set.

In some examples, if it is necessary to perform capacity-expanding on a cold/hot state set, a capacity of the cold/hot state set can be doubled. In an implementation, the capacity-expanding can be performed on the cold/hot state set according to other standard, which is not limited in embodiments of the present disclosure.

A specific way of performing capacity-expanding on a cold/hot state set in a non-scanning state can refer to the previous description, and will not be repeated here.

S1103, judging whether the used item in each cold/hot state set is empty. If the used item in a cold/hot state set is empty and capacity-expanding has been performed, a capacity-shrinking operation can be performed on the cold/hot state set.

As an example, capacity-shrinking can be performed on the cold/hot state set to a default size.

S1104: acquiring a scanning lock sign.

The scanning lock is configured to avoid other tasks updating the memory range being scanned during scanning. The scanning lock can correspond to all cold/hot state sets in a node, or to one cold/hot state set, or its locking range can be defined according to practice.

S1105, starting to periodically scan a cold/hot state set.

In an implementation, each scan can traverse all items in a cold/hot state set, and record current position information (cur parameter) of the item being scanned in the set, as well as previous position information (prev parameter) and next position information (nex parameter) of the item.

S1106, scanning sequentially physical address of each memory slice in an item to judge whether there is a state transition occurring in a memory area.

S1107, if a state transition occurs in a section of memory area in the item, moving a record of the section of memory area out of the item and inserting it into a corresponding cold/hot state set.

In an implementation, during moving out of the memory area, there may be cases of deleting an item or inserting an item, which will change a position of an original item in a cold/hot state set, so it is necessary to update a value of a scanning parameter during scanning. The scanning parameter includes, but is not limited to, a prev parameter, a cur parameter and a nex parameter.

In an implementation, in the case that a new item needs to be inserted, at first, it can be judged whether it is necessary to perform capacity-expanding on a cold/hot state set. For example, if the number of items in the cold/hot state set reaches a high threshold, it is necessary to enter a capacity-expanding process.

A method of performing capacity-expanding in a scanning state can refer to the description in FIG. 8, and will not be repeated here.

In some examples, if the capacity-expanding fails, and the cold/hot state set is marked with a retry capacity-expanding sign, the cold/hot state set can be marked with reset (reset); if the capacity-expanding is successful, or there is no retry capacity-expanding sign in the cold/hot state set, the cold/hot state set can be sorted.

For a specific method of sorting a cold/hot state set, please refer to FIG. 9 and related description.

In some examples, a record of a memory area with a state transition can be moved out of the current item and inserted at the end of a cold/hot state set corresponding to a state type after the state transition. As an example, during inserting a new item, it may need to perform capacity-expanding on the cold/hot state set.

S1108, judging whether there is a failure during moving the record of the memory area in the cold/hot state set.

In an implementation, when a failure occurs, a reset (reset) sign may be marked on the cold/hot state set of moving-out or the cold/hot state set of moving-in, and a cycle process is skipped, and S1113 is executed.

S1109, judging whether scanning of all memory slices in a current item is completed, and if not, executing in continue the cycle process from step S1106.

S1110, if the scanning of all memory slices in the current item is completed, judging whether traversing of all items in a cold/hot state set is completed, and if not, executing from step S1105; if the traversing of all items in a cold/hot state set is completed, ending the whole scanning process.

S1111, releasing a scanning lock, and ending the scanning.

In an implementation, each cold/hot state set can enter a sleep period to wait for the next scanning period.

S1112, checking data integrity of each cold/hot state set.

For example, it can be checked whether there is an isolated item in a cold/hot state set that is not in a link order of an item array, and if there is an isolated item, the isolated item can be marked as an error.

S1113, checking whether there is an error during scanning. If there is an error, resetting and initializing all cold/hot state sets.

For example, checking whether there is a reset (reset) sign in each cold/hot state set. If there is a reset (reset) sign, it indicates that there is an error during scanning, and all cold/hot state sets can be released to prepare for reallocating and initialization.

In the embodiment of the present disclosure, a memory cold/hot management architecture is proposed to manage a cold/hot state of a reserved memory of a host machine, and an out-of-order array is designed to record a cold/hot change of a reserved memory, and a scheme of how to perform capacity-expanding to, sort, perform capacity-shrinking to and reset an array during an aging process of recording a cold/hot data of a reserved memory by a host machine is provided, and a scheme of how to reset in the case that there is an error during scanning are provided. In the above schemes, because out-of-order arrangement of the out-of-order array can save memory space, and each item only occupies a few bytes, it saves the memory space occupied by metadata in the host machine while the function of recording a cold/hot state of a memory is completed, and more reserved memory for a virtual machine is reserved, which can improve memory utilization efficiency of the host machine.

In addition, because a cold/hot state of a memory will change according to the change of practice, with the change of the cold/hot state of the memory, a size of an array may occur cases of space being insufficient, space being idle or data unable to be updated, which may lead to a waste of space or an error in a cold/hot recording process. Therefore, by providing the scheme of performing capacity-expanding on, sorting, performing capacity-shrinking on, and resetting an array, the efficiency of cold/hot management of a reserved memory of a host machine can be improved.

Figure 12:
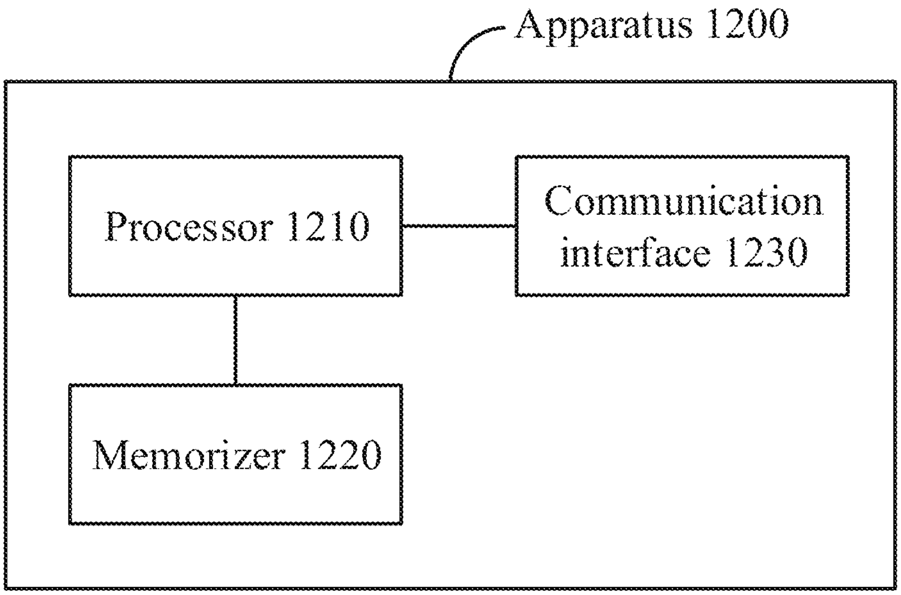
FIG. 12 is a schematic structural diagram of an apparatus 1200 according to an embodiment of the present disclosure.

FIG. 12 is a schematic structural diagram of an apparatus 1200 according to an embodiment of the present disclosure. The apparatus 1200 is configured to perform the method performed by the host machine above.

The apparatus 1200 includes a processor 1210, which is configured to execute a computer program or an instruction stored in a memorizer 1220 or read data stored in the memorizer 1220, so as to execute the methods in the above method embodiments. In an implementation, there are one or more processors 1210.

In an implementation, as shown in FIG. 12, the apparatus 1200 further includes the memorizer 1220 configured to store a computer program or an instruction and/or data. The memorizer 1220 may be integrated with the processor 1210, or may be provided separately. In an implementation, there are one or more memorizers 1220.

In an implementation, as shown in FIG. 12, the apparatus 1200 further includes a communication interface 1230 configured to receive and/or transmit signals. For example, the processor 1210 is configured to control the communication interface 1230 to receive and/or transmit signals.

In an implementation, the apparatus 1200 is configured to implement an operation performed by a host machine in each of the above method embodiments.

For example, the processor 1210 is configured to execute a computer program or an instruction stored in the memorizer 1220, so as to implement a related operation of a host machine in each of the above method embodiments. For example, the processor 1210 is configured to perform steps in the methods in FIG. 4 to FIG. 11.

It should be pointed out that the apparatus 1200 in FIG. 12 can be a host machine in the aforementioned embodiment, or it can be a component (such as a chip) of a host machine, and is not limited here.

In an embodiment of the present disclosure, a processor is a circuit with signal processing capability. In one implementation, the processor can be a circuit with instruction reading and running capability, such as a CPU, a microprocessor, a GPU (which can be understood as a microprocessor), or a DSP, etc. In another implementation, the processor can implement a certain function through the logical relationship of a hardware circuit, and the logical relationship of the hardware circuit is fixed or reconfigurable. For example, the processor is a hardware circuit implemented by an ASIC or a PLD, such as an FPGA. In the reconfigurable hardware circuit, the process loads a configuration document to implement hardware circuit configuration, which can be understood as a process that the processor loads an instruction to implement a function of some or all of the above units. In addition, it can also be a hardware circuit designed for artificial intelligence, which can be understood as an ASIC, such as a NPU, a TPU, a DPU, etc.

It can be seen that each unit in the above apparatus can be one or more processors (or processing circuits) configured to implement the above method, such as a CPU, a GPU, a NPU, a TPU, a DPU, a microprocessor, a DSP, an ASIC, an FPGA, or a combination of at least two of these processor forms.

In addition, each unit in the above apparatus can be integrated together in whole or in part, or can be implemented independently. In one implementation, these units are integrated and implemented in the form of system-on-a-chip (SOC). The SOC may include at least one processor, which is configured to implement any of the above methods or a function of each unit of the apparatus. The at least one processor may be of different in types, including, for example, a CPU and an FPGA, a CPU and an artificial intelligence processor, a CPU and a GPU, etc.

Correspondingly, an embodiment of the present disclosure also provides a computer-readable storage medium storing a computer program/instruction, which, when executed by a processor, causes a processor to implement steps in the methods executed by a host machine in FIG. 4 to FIG. 11.

Correspondingly, an embodiment of the present disclosure also provides a computer program product, including a computer program/instruction, which, when executed by a processor, cause the processor to implement steps in the methods executed by a host machine in FIG. 4 to FIG. 11.

It should be understood by those skilled in the art that embodiments of the present disclosure can be provided as a method, a system, or a computer program product. Therefore, the present disclosure can take a form of an entirely hardware embodiment, an entirely software embodiment, or an embodiment combining software and hardware aspects. Furthermore, the present disclosure can take the form of a computer program product embodied on one or more computer usable storage medium (including but not limited to disk storage, CD-ROM, optical storage, etc.) containing a computer usable program code therein.

The present disclosure is described with reference to a flowchart and/or a block diagram of a method, a device (system) and a computer program product according to an embodiment of the present disclosure. It should be understood that each flow and/or block in the flowchart and/or block diagram, and a combination of the flow and/or block in the flowchart and/or block diagram can be implemented by computer program instructions. These computer program instructions may be provided to a processor of a general-purpose computer, special-purpose computer, embedded processor or other programmable data processing device to produce a machine, such that the instructions which are executed by the processor of the computer or other programmable data processing device produce an apparatus for implementing a function specified in one or more flows in the flowchart and/or one or more blocks in the block diagram.

These computer program instructions may also be stored in a computer-readable memorizer that can direct a computer or other programmable data processing device to function in a particular manner, such that the instructions stored in the computer-readable memorizer produce an article of manufacture including instruction means, and the instruction means implements a function specified in one or more flows in the flowchart and/or one or more blocks in the block diagram.

These computer program instructions may also be loaded onto a computer or other programmable data processing device, such that a series of operational steps are performed on the computer or other programmable device to produce a computer-implemented process, such that the instructions executed on the computer or other programmable device provide steps for implementing a function specified in one or more flows in the flowchart and/or one or more blocks in the block diagram.

In a typical configuration, a computing device includes one or more processors (CPU), an input/output interface, a network interface, and a memory.

The memory may include a non-permanent memorizer, a random access memorizer (RAM) and/or a nonvolatile memory in computer-readable medium, such as a read-only memorizer (ROM) or a flash memory. A memory is an example of a computer-readable medium.

The computer-readable medium, including a permanent and non-permanent, removable and non-removable media, can store information by any method or technology. The information can be a computer-readable instruction, a data structure, and a module of a program or other data. Examples of storage medium for a computer include, but not limited to a phase-change memory (PRAM), a static random access memorizer (SRAM), a dynamic random access memorizer (DRAM), other types of random access memorizer (RAM), a read-only memorizer (ROM), an electrically erasable programmable read-only memorizer (EEPROM), a flash memory or other memory technologies, CD read-only memorizer (CD-ROM), and a digital versatile disc (DVD), or other optical storage, a magnetic cassette, a magnetic tape magnetic disk storage or other magnetic storage device or any other non-transmission medium, can be configured to store information that can be accessed by a computing device. According to the definition in this specification, a computer-readable medium does not include a transitory media, such as a modulated data signal and carrier wave.

It should also be noted that the terms "include", "including" or any other variation thereof are intended to cover non-exclusive inclusion, so that a process, method, commodity or device including a series of elements includes not only those elements, but also other elements not explicitly listed, or elements inherent to such process, method, commodity or device. Without more restrictions, the element defined by the sentence "including a . . . " does not exclude that there are other identical elements in the process, method, commodity or device including the element.

The above are only embodiments of the present disclosure, and don't intend to limit the present disclosure. Various modifications and variations of the present disclosure will occur to those skilled in the art. Any modification, equivalent substitution, improvement, etc. made within the spirit and principle of the present disclosure should fall into the scope of the claims of the present disclosure.

The invention claimed is:

1. A method for recording a cold/hot state of a memory, comprising:

determining a first cold/hot state set, wherein the first cold/hot state set is configured for recording a first cold/hot state type of a reserved memory of a host machine, wherein a plurality of cold/hot state sets are maintained in the host machine, and each cold/hot state set corresponds to one cold/hot state type;

scanning sequentially an item in the first cold/hot state set, wherein the first cold/hot state set comprises at least one item, and the at least one item forms an out-of-order array, and each item comprises a memory slice serial number, memory size information, a next field and a process field;

the scanning sequentially an item in the first cold/hot state set comprises:

scanning a first memory area in a first item, and judging whether a state transition occurs in the first memory area, wherein the first item is any one item in the first cold/hot state set, and the first memory area comprises one or more continuous memory slices;

in the case that the state transition occurs in the first memory area, deleting data recording the first memory area from the first item, and creating a second item in a second cold/hot state set, wherein the second item is configured for recording a cold/hot state of the first memory area, and the second cold/hot state set corresponds to a second cold/hot state type of the first memory area after the state transition occurs.

2. The method according to claim 1, wherein the method further comprises: judging whether a ratio of a number of used items to a total number of items in the first cold/hot state set reaches a low threshold, before the scanning sequentially an item in the first cold/hot state set; if the low threshold is reached, performing a capacity-expanding operation on the cold/hot state set.

3. The method according to claim 2, wherein the method further comprises: judging whether a second ratio of a second number of used items to a second total number of items in the second cold/hot state set reaches a high threshold, before the creating a second item in a second cold/hot state set, wherein the low threshold is smaller than the high threshold; if the high threshold is reached, performing a capacity-expanding operation on the second cold/hot state set.

4. The method according to claim 2, wherein before the scanning sequentially an item in the first cold/hot state set, the method further comprises:

judging whether a used item in the first cold/hot state set is empty;

if the used item in the first cold/hot state set is empty, judging whether capacity-expanding has been performed on the first cold/hot state set;

if capacity-expanding has been performed on the first cold/hot state set, performing a capacity-shrinking operation on the first cold/hot state set.

5. The method according to claim 2, wherein the method further comprises:

judging whether a size of the second cold/hot state set reaches a warning threshold, before the creating a second item in a second cold/hot state set;

in the case that the warning threshold is reached, sorting the second cold/hot state set, wherein the sorting comprises: performing a merging operation on mergeable items in the second cold/hot state set.

6. The method according to claim 5, wherein the sorting the second cold/hot state set comprises: establishing a temporary set; inserting sequentially an item in the second cold/hot state set into the temporary set, and traversing and judging whether there are mergeable items in the temporary set when inserting the item; if there are mergeable items, performing a merging operation on the mergeable items; if there are no mergeable items, inserting the item into the temporary set according to an order of physical address; clearing the second cold/hot state set to zero after all items in the second cold/hot state set are inserted into the temporary set; copying items in the temporary set into the second cold/hot state set after the second cold/hot state set is cleared to zero, and releasing the temporary set.

7. The method according to claim 2, wherein the method further comprises:

determining that an error occurs during scanning the first cold/hot state set;

releasing each cold/hot state set maintained by the host machine;

reallocating each cold/hot state set.

8. The method according to claim 1, wherein before the scanning sequentially an item in the first cold/hot state set, the method further comprises:

judging whether a used item in the first cold/hot state set is empty;

if the used item in the first cold/hot state set is empty, judging whether capacity-expanding has been performed on the first cold/hot state set;

if capacity-expanding has been performed on the first cold/hot state set, performing a capacity-shrinking operation on the first cold/hot state set.

9. The method according to claim 1, wherein the method further comprises:

judging whether a size of the second cold/hot state set reaches a warning threshold, before the creating a second item in a second cold/hot state set;

in the case that the warning threshold is reached, sorting the second cold/hot state set, wherein the sorting comprises: performing a merging operation on mergeable items in the second cold/hot state set.

10. The method according to claim 9, wherein the sorting the second cold/hot state set comprises:

establishing a temporary set;

inserting sequentially an item in the second cold/hot state set into the temporary set, and traversing and judging whether there are mergeable items in the temporary set when inserting the item;

if there are mergeable items, performing a merging operation on the mergeable items; if there are no mergeable items, inserting the item into the temporary set according to an order of physical address;

clearing the second cold/hot state set to zero after all items in the second cold/hot state set are inserted into the temporary set;

copying items in the temporary set into the second cold/hot state set after cleared to zero, and releasing the temporary set.

11. The method according to claim 1, wherein the method further comprises:

determining that an error occurs during scanning the first cold/hot state set;

releasing each cold/hot state set maintained by the host machine;

reallocating each cold/hot state set.

12. An apparatus for recording a cold/hot state of a memory, comprising: a processor and a memorizer in communication with the processor; the memorizer stores a computer-executed instruction; the processor executes the computer-executed instruction stored in the memorizer to implement the following steps: determining a first cold/hot state set, wherein the first cold/hot state set is configured for recording a first cold/hot state type of a reserved memory of a host machine, wherein a plurality of cold/hot state sets are maintained in the host machine, and each cold/hot state set corresponds to one cold/hot state type; scanning sequentially an item in the first cold/hot state set, wherein the first cold/hot state set comprises at least one item, and the at least one item forms an out-of-order array, and each item comprises a memory slice serial number, memory size information, a next field and a process field; wherein regarding the scanning sequentially an item in the first cold/hot state set, the processor is specifically configured to: scan a first memory area in a first item, and judge whether a state transition occurs in the first memory area, wherein the first item is any one item in the first cold/hot state set, and the first memory area comprises one or more continuous memory slices; in the case that the state transition occurs in the first memory area, delete data recording the first memory area from the first item, and create a second item in a second cold/hot state set, wherein the second item is configured for recording a cold/hot state of the first memory area, and the second cold/hot state set corresponds to a second cold/hot state type of the first memory area after the state transition occurs.

13. The apparatus according to claim 12, wherein the processor is further configured to: judge whether a ratio of a number of used items to a total number of items in the first cold/hot state set reaches a low threshold before the scanning sequentially an item in the first cold/hot state set; if the low threshold is reached, perform a capacity-expanding operation on the first cold/hot state set.

14. The apparatus according to claim 13, wherein the processor is further configured to: judge whether a second ratio of a second number of used items to a second total number of items in the second cold/hot state set reaches a high threshold before the create a second item in a second cold/hot state set, wherein the low threshold is smaller than the high threshold; if the high threshold is reached, perform a capacity-expanding operation on the second cold/hot state set.

15. The apparatus according to claim 13, wherein the processor is further configured to: judge whether a size of the second cold/hot state set reaches a warning threshold before the create a second item in a second cold/hot state set; in the case that the warning threshold is reached, sort the second cold/hot state set, wherein the sort comprises: perform a merging operation on mergeable items in the second cold/hot state set.

16. The apparatus according to claim 15, wherein, regarding the sort the second cold/hot state set, the processor is specifically configured to: establish a temporary set; insert sequentially an item in the second cold/hot state set into the temporary set, and traverse and judge whether there are mergeable items in the temporary set when inserting the item; if there are mergeable items, perform a merging operation on the mergeable items; if there are no mergeable items, insert the item into the temporary set according to an order of physical address; clear the second cold/hot state set to zero after all items in the second cold/hot state set are inserted into the temporary set; copy items in the temporary set into the second cold/hot state set after the second cold/hot state set is cleared to zero, and release the temporary set.

17. The apparatus according to claim 12, wherein, before the scanning sequentially an item in the first cold/hot state set, the processor is further configured to: judge whether a used item in the first cold/hot state set is empty; if the used item in the first cold/hot state set is empty, judge whether a capacity-expanding has been performed on the first cold/hot state set; if capacity-expanding has been performed on the first cold/hot state set, perform a capacity-shrinking operation on the first cold/hot state set.

18. The apparatus according to claim 13, wherein, before the scanning sequentially an item in the first cold/hot state set, the processor is further configured to: judge whether a used item in the first cold/hot state set is empty; if the used item in the first cold/hot state set is empty, judge whether capacity-expanding has been performed on the first cold/hot state set; if capacity-expanding has been performed on the first cold/hot state set, perform a capacity-shrinking operation on the first cold/hot state set.

19. The apparatus according to claim 13, wherein the processor is further configured to: judge whether a size of the second cold/hot state set reaches a warning threshold before the create a second item in a second cold/hot state set; in the case that the warning threshold is reached, sort the second cold/hot state set, wherein the sort comprises: perform a merging operation on mergeable items in the second cold/hot state set.

20. A non-transitory computer-readable storage medium for storing a computer program, wherein the computer program comprises codes for implement the following steps:

determining a first cold/hot state set, wherein the first cold/hot state set is configured for recording a first cold/hot state type of a reserved memory of a host machine, wherein a plurality of cold/hot state sets are maintained in the host machine, and each cold/hot state set corresponds to one cold/hot state type;

scanning sequentially an item in the first cold/hot state set, wherein the first cold/hot state set comprises at least one item, and the at least one item forms an out-of-order array, and each item comprises a memory slice serial number, memory size information, a next field and a process field;

the scanning sequentially an item in the first cold/hot state set comprises:

scanning a first memory area in a first item, and judging whether a state transition occurs in the first memory area, wherein the first item is any one item in the first cold/hot state set, and the first memory area comprises one or more continuous memory slices;

in the case that the state transition occurs in the first memory area, deleting data recording the first memory area from the first item, and creating a second item in a second cold/hot state set, wherein the second item is configured for recording a cold/hot state of the first memory area, and the second cold/hot state set corresponds to a second cold/hot state type of the first memory area after the state transition occurs.

* * * * *